(12) United States Patent (10) Patent No.: US 12,633,030 B2

Sheran et al. (45) Date of Patent: May 19, 2026

(54) OPTIMIZATION OF GRAPHICS WORKLOADS THROUGH FUTURE FRAMES

(71) Applicant: QUALCOMM Incorporated, San Diego, CA (US)

(72) Inventors: Alec Matthew Sheran, Franklin, MA (US); Tate Hornbeck, Cambridge, MA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 18/434,716

(22) Filed: Feb. 6, 2024

(65) Prior Publication Data

US 2025/0252648 A1 Aug. 7, 2025

(51) Int. Cl.
G06T 15/00 (2011.01)
G06F 9/50 (2006.01)

(52) U.S. Cl.
CPC ............ G06T 15/005 (2013.01); G06F 9/505 (2013.01)

(58) Field of Classification Search
CPC .............................. G06T 15/005; G06F 9/505
See application file for complete search history.

(56) References Cited

U.S. PATENT DOCUMENTS

2014/0306971 A1* 10/2014 Frascati ................... G06T 15/04
345/522
2018/0040096 A1* 2/2018 Benthin ................ G06F 9/4881

2018/0293699 A1* 10/2018 Venkatesh ........... G06F 9/30145
2019/0243764 A1* 8/2019 Sakthivel ............... G06N 3/088
2020/0090396 A1 3/2020 Holmes et al.
2021/0158470 A1 5/2021 Alla et al.
2022/0035684 A1* 2/2022 Gupte ................. G06F 9/30079
2022/0319090 A1* 10/2022 Croxford .............. G06T 15/005

OTHER PUBLICATIONS

Arnau J-M., et al., "Parallel Frame Rendering: Trading Responsiveness for Energy on a Mobile GPU", Proceedings of the 22nd International Conference on Parallel Architectures and Compilation Techniques, IEEE, Piscataway, NJ, USA, Sep. 7, 2013, pp. 83-92, XP032495021, 10 Pages, Abstract.
International Search Report and Written Opinion—PCT/US2025/011569—ISA/EPO—May 9, 2025.

* cited by examiner

*Primary Examiner* — Terrell M Robinson
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for optimization of graphics workloads through future frames. The method includes obtaining first frame data at a first graphics processor core of a graphics processor and second frame data at a second graphics processor core of the graphics processor, where the first frame data is associated with a first time instance and the second frame data is associated with a second time instance. The method includes altering a first workload associated with the first frame data at the first graphics processor core based on a portion of a second workload for the second frame data that has been previously executed by the second graphics processor core and a shared resource between the first graphics processor core and the second graphics processor core and outputting an indication of the altered first workload.

20 Claims, 10 Drawing Sheets

100

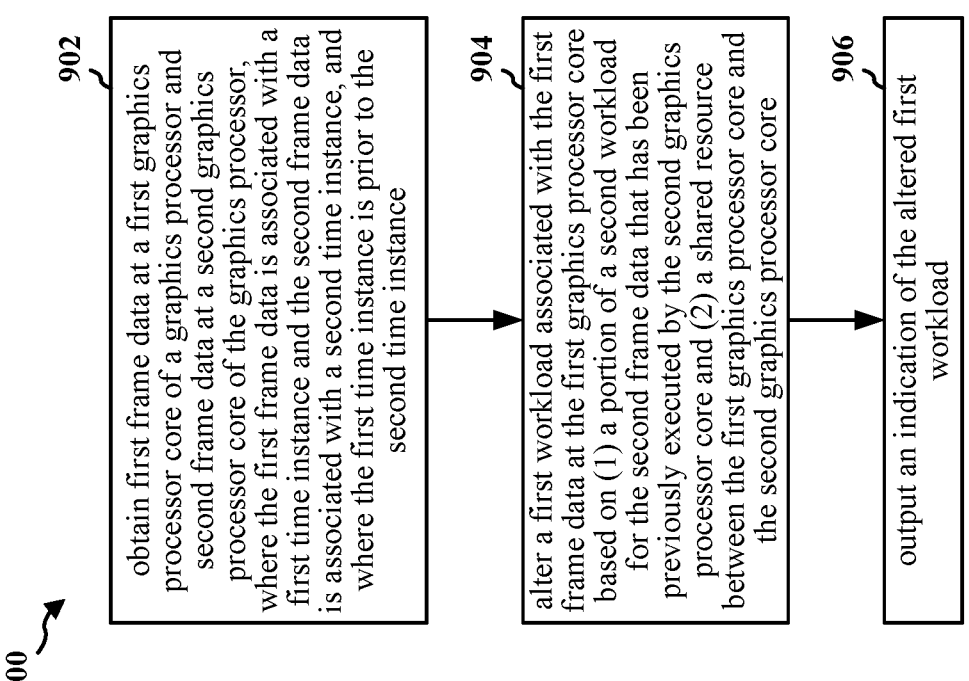

902 obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance

904 alter a first workload associated with the first frame data at the first graphics processor core based on (1) a portion of a second workload for the second frame data that has been previously executed by the second graphics processor core and (2) a shared resource between the first graphics processor core and the second graphics processor core

906 output an indication of the altered first workload

Figure 10:
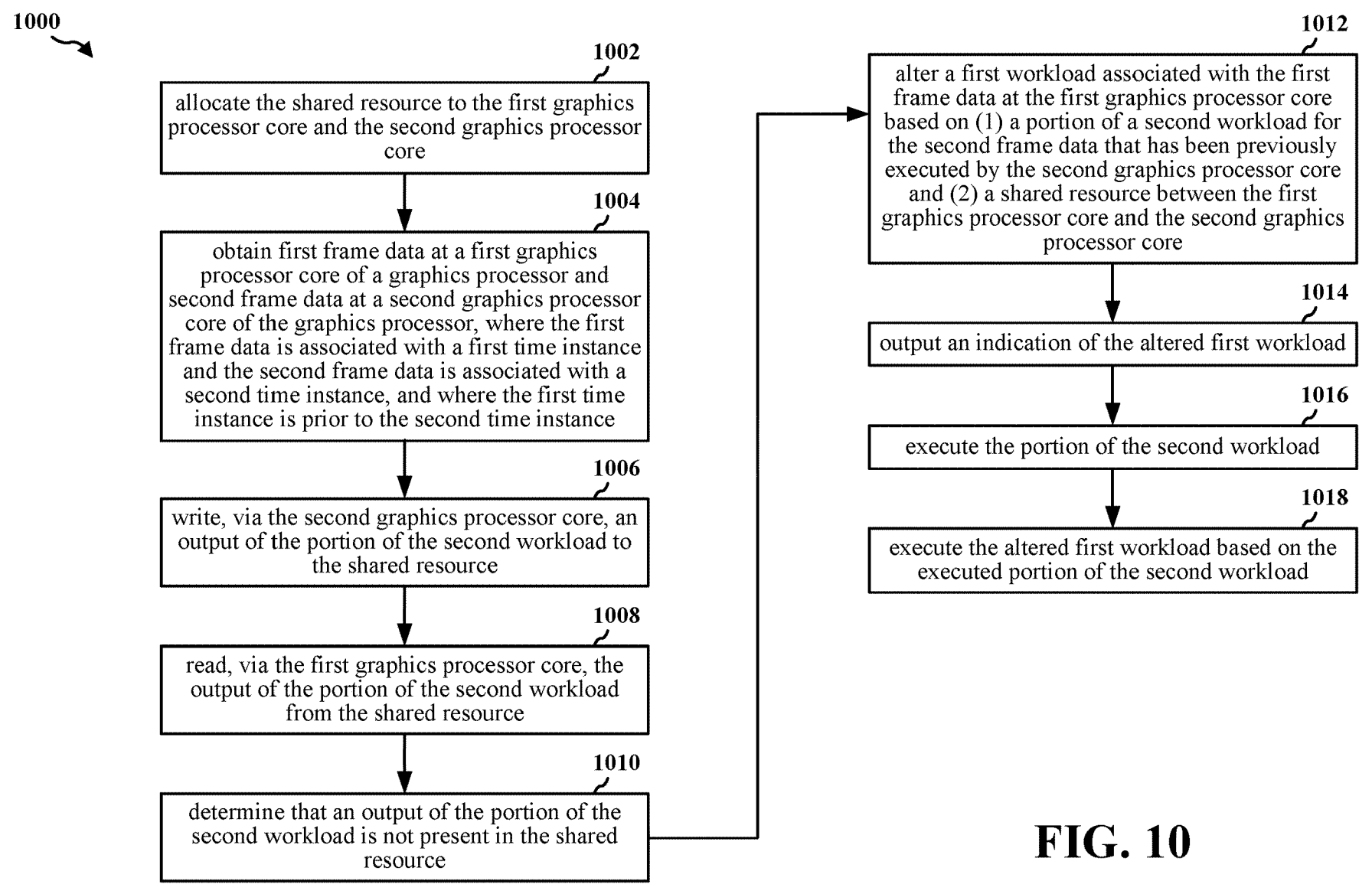

1002 — allocate the shared resource to the first graphics processor core and the second graphics processor core 1004 — obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance 1006 — write, via the second graphics processor core, an output of the portion of the second workload to the shared resource 1008 — read, via the first graphics processor core, the output of the portion of the second workload from the shared resource 1010 — determine that an output of the portion of the second workload is not present in the shared resource 1012 — alter a first workload associated with the first frame data at the first graphics processor core based on (1) a portion of a second workload for the second frame data that has been previously executed by the second graphics processor core and (2) a shared resource between the first graphics processor core and the second graphics processor core 1014 — output an indication of the altered first workload 1016 — execute the portion of the second workload 1018 — execute the altered first workload based on the executed portion of the second workload

OPTIMIZATION OF GRAPHICS WORKLOADS THROUGH FUTURE FRAMES

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for graphics processing may be associated with the sequential processing of frames, and hence information from a later processed frame may not be used for work on a prior frame. There is a need for improved graphics processing techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for graphics processing are provided. The apparatus includes a memory; and a processor coupled to the memory and, based on information stored in the memory, the processor is configured to: obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance; alter a first workload associated with the first frame data at the first graphics processor core based on (1) a portion of a second workload for the second frame data that has been previously executed by the second graphics processor core and (2) a shared resource between the first graphics processor core and the second graphics processor core; and output an indication of the altered first workload.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of an example method of graphics processing in accordance with one or more techniques of this disclosure.

FIG. 10 is a flowchart of an example method of graphics processing in accordance with one or more techniques of this disclosure.

DETAILED DESCRIPTION

Figure 1:
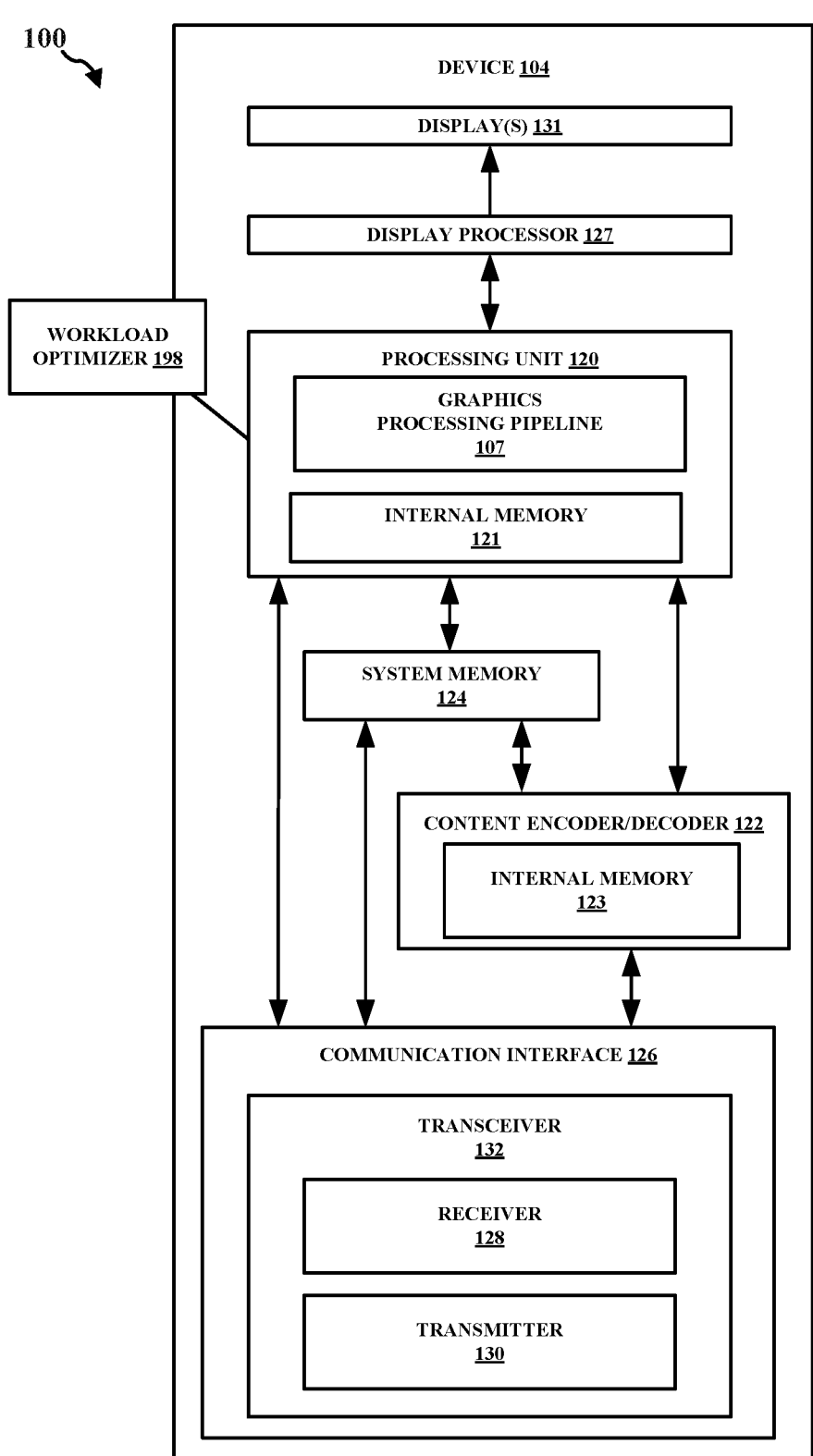
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may have its data stored in a memory (e.g., on-chip memory of a processor, system memory, or any other memory). On-chip memory may refer to memory that resides on a chip. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In graphics applications, a GPU driver executed by a central processing unit (CPU) may transmit frames of work sequentially to a graphics processing unit (GPU) due to a sequential relationship between the frames of work, that is, the frames of work may progressively build off of one another. A GPU driver may refer to a set of files that instructs a graphics processor (e.g., a GPU) of a computing system how to function by communicating other elements of the computing system. For instance, the GPU driver may transmit a first frame to the GPU at a first time instance and a second frame to the GPU at a second time instance, where the first time instance is prior to the second time instance. However, due to a sequential relationship between the first frame and the second frame, there may be information in/associated with the second frame that could have been used to optimize generation of the first frame if such information were available to the GPU driver during the generation of the first frame. For example, if an application clears or discards a resource (e.g., a render target) in/associated with the second frame, the application may use this information to prevent the resource from being stored from on-chip memory to off-chip memory, as the resource will not be utilized for the second frame. Preventing the source from being stored from on-chip memory to off-chip memory may reduce overhead and/or reduce power consumption of the GPU. However, the GPU driver may not be readily able to attain the information that prevents the resource from being stored. For instance, attaining the information may entail complicated patching of previously generated GPU command streams. Such patching may cause additional overhead and may delay a GPU in starting work, which may lead to a reduced frame rate, increased input lag, and/or visual stuttering.

Various technologies pertaining to optimization of graphics workloads through future frames are described herein. In an example, an apparatus obtains first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. As used herein, "frame data" may refer to data that is used to render and/or present a frame. As used herein, a "graphics processor core" may refer to a processing unit that reads and executes programming instructions. As used herein, a "time instance" may refer to a point in time or a period of time. The apparatus alters a first workload associated with the first frame data at the first graphics processor core based on (1) a portion of a second workload for the second frame data that has been previously executed by the second graphics processor core and (2) a shared resource between the first graphics processor core and the second graphics processor core. As used herein, a "workload" may refer to instructions executed by a graphics processor core that facilitate the presentation of graphical content. The apparatus outputs an indication of the altered first workload. Vis-à-vis altering the first workload associated with the first frame data based on (1) the portion of the second workload for the second frame data that has been previously executed by the second graphics processor core and (2) the shared resource, the apparatus may optimize the first workload, which may conserve computing resources. For instance, if the second workload clears or discards a particular resource for the second frame, the first workload may be altered such that the particular resource is discarded, as the particular resource will not be utilized again.

There may be information in frame N+1 that may have helped to optimize frame N if such information were available during a graphics processing unit (GPU) driver generation of frame N itself. For example, if an application clears or discards a particular resource in frame N+1, then frame N may use that fact to prevent storing the same resource from on-chip memory out to off-chip memory since the resource may not be needed again, thereby reducing overhead and saving power. In one aspect described herein, a multicore GPU may begin working on a later frame while still processing an earlier frame via a resource shared by all GPU cores of the multicore GPU. Two frames may communicate information with each other during an overlapped portion associated with the work. Work from frame N that has yet to execute during the overlapped portion may be dynamically altered based on information shared by work already executed for frame N+1. The on-GPU process may be orchestrated by a GPU driver though embedding logic in a GPU command stream for a GPU core during each frame.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a workload optimizer 198 configured to obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance; alter a first workload associated with the first frame data at the first graphics processor core based on (1) a portion of a second workload for the second frame data that has been previously executed by the second graphics processor core and (2) a shared resource between the first graphics processor core and the second graphics processor core; and output an indication of the altered first workload. Although the following description may be focused on graphics processing, the concepts described herein may be applicable to other similar processing techniques. Furthermore, although the following description may be focused on a multi-core GPU with two cores, the concepts described herein may be applicable to a multi-core GPU with more than two cores (e.g., four cores, eight cores, ten cores, etc.).

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
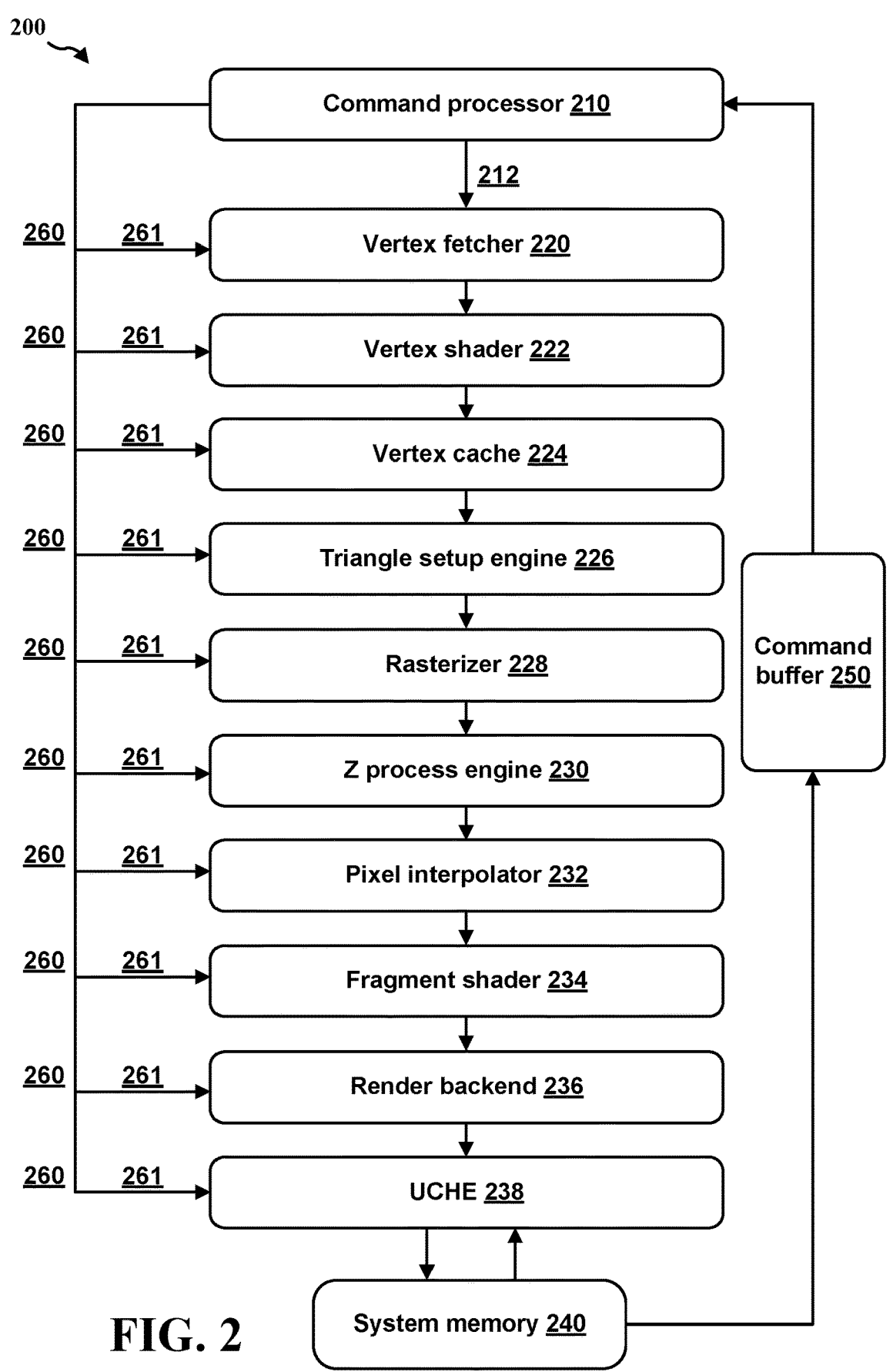
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
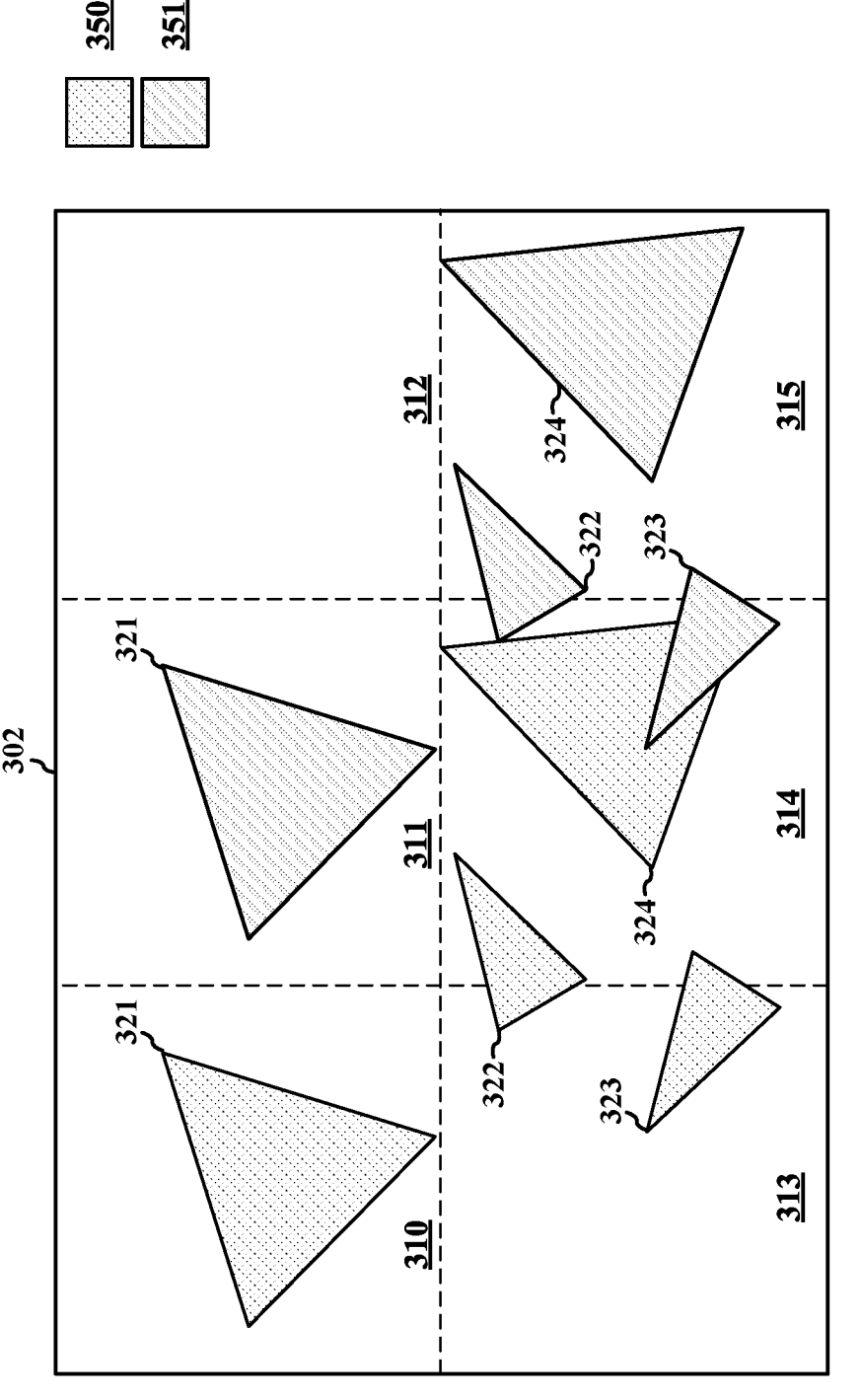
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. Additionally, data can be stored at the DDR or DRAM. In some aspects, such as in bin or tiled rendering, a small portion of the memory can be stored at the GPU, e.g., at the GMEM. In some instances, storing data at the GMEM out to system memory at the DDR or DRAM may utilize a larger processing workload and/or consume more power compared to a case where the storing such data is not performed.

Figure 4:
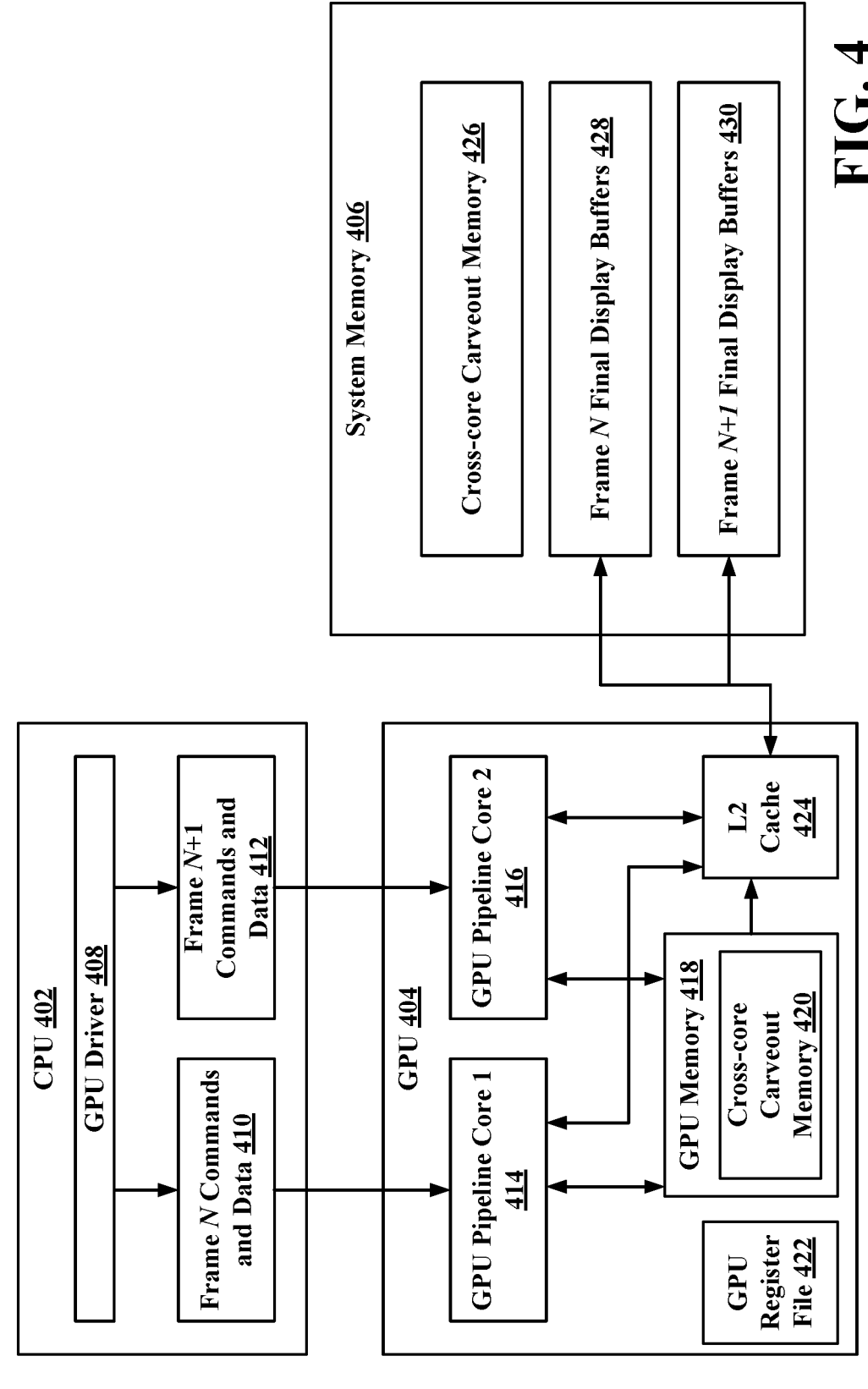
FIG. 4 is a diagram illustrating an example of a CPU, a GPU, and system memory in accordance with one or more techniques of this disclosure.

FIG. 4 is a diagram 400 illustrating an example of a CPU 402, a GPU 404, and system memory 406 in accordance with one or more techniques of this disclosure. In an example, the CPU 402, the GPU 404, and the system memory 406 may be included in the device 104. In an example, the CPU 402 and/or the GPU 404 may be included in the processing unit 120 of the device 104 or the CPU 402 and/or the GPU 404 may be or include the processing unit 120 of the device 104. In an example, the GPU 404 may be or include the GPU 200. The GPU 404 may be a multi-core GPU. A multi-core GPU may refer to a GPU that includes multiple pipelines within GPU hardware that may execute in parallel. In an example, each of the multiple pipelines may include a GPU core. In an example, the system memory 406 may be or include the system memory 124.

The CPU 402 may execute a GPU driver 408 (i.e., GPU driver software) corresponding to the GPU 404. The GPU driver 408 may be stored in memory (not depicted in FIG. 4). The GPU driver 408 may receive, sequentially and from an application (not depicted in FIG. 4), data associated with frame N (not depicted in FIG. 4) and data associated with frame N+1 (not depicted in FIG. 4), where N is an integer. Based on the data associated with frame N and the data associated with frame N+1, the GPU driver 408 may construct sequentially, frame N commands and data 410 and frame N+1 commands and data 412, respectively. A command may refer to instructions executed by a processor.

The GPU driver 408 may transmit the frame N commands and data 410 to a first GPU pipeline core 414 of the GPU 404 and the GPU driver 408 may transmit the frame N+1 commands and data 412 to a second GPU pipeline core 416 of the GPU 404. In an example, the GPU driver 408 may transmit the frame N commands and data 410 and the frame N+1 commands and data 412 sequentially. In an example, the first GPU pipeline core 414 may be associated with a first core of the GPU (not depicted in FIG. 4) and the second GPU pipeline core 416 may be associated with a second core of the GPU (not depicted in FIG. 4). The first GPU pipeline core 414 may execute the frame N commands of the frame N commands and data 410 and the second GPU pipeline core 416 may execute the frame N+1 commands of the frame N+1 commands and data 412. Execution of the frame N commands of the frame N commands and data 410 may entail performing processing on the data of the frame N commands and data 410 and execution of the frame N+1 commands of the frame N+1 commands and data 412 may entail performing processing on the data of the frame N+1 commands and data 412.

The GPU 404 may include GPU memory 418. GPU memory may refer to on-chip memory of a graphics processor (e.g., a GPU). In an example, the GPU memory 418 may be or include the internal memory 121 of the device 104. The GPU memory 418 may include cross-core carveout memory 420 that is accessible to/by both the first GPU pipeline core 414 and the second GPU pipeline core 416. For instance, both the first GPU pipeline core 414 and the second GPU pipeline core 416 may read from and/or write to the cross-core carveout memory 420. In an example, the first GPU pipeline core 414 may read from and/or write to the cross-core carveout memory 420 when executing the commands of the frame N commands and data 410 and the second GPU pipeline core 416 may read from and/or write to the cross-core carveout memory 420 when executing the commands of the frame N+1 commands and data 412. In an example, results of the execution of the commands of the frame N commands and data 410 may be stored in the cross-core carveout memory 420 and results of the execution of the commands of the frame N+1 commands and data 412 may be stored in the cross-core carveout memory 420. The cross-core carveout memory 420 may be referred to as a shared resource between the first GPU pipeline core 414 and the second GPU pipeline core 416. In one aspect, the cross-core carveout memory 420 may store a shared resource between the first GPU pipeline core 414 and the second GPU pipeline core 416.

The GPU 404 may include a GPU register file 422 (i.e., a graphics processor register file). The GPU register file 422 may be a file that maintains a state for threads that support processing in the GPU 404. The GPU register file 422 may be stored in memory of the GPU (e.g., the GPU memory 418, a cache, or some other memory of the GPU). In an example, the first GPU pipeline core 414 may read from and/or write to the GPU register file 422 when executing the commands of the frame N commands and data 410 and the second GPU pipeline core 416 may read from and/or write to the GPU register file 422 when executing the commands of the frame N+1 commands and data 412. The GPU register file 422 may be referred to as a shared resource between the first GPU pipeline core 414 and the second GPU pipeline core 416. In one aspect, the GPU register file 422 (or a portion thereof) may be shared resource between the first GPU pipeline core 414 and the second GPU pipeline core 416.

The GPU 404 may also include a level 2 (L2) cache 424 that is accessible to/by the first GPU pipeline core 414 and the second GPU pipeline core 416. For instance, the first GPU pipeline core 414 and the second GPU pipeline core 416 may read from or write to the L2 cache 424. In an example, the first GPU pipeline core 414 may read from and/or write to the L2 cache 424 when executing commands of the frame N commands and data 410 and the second GPU pipeline core 416 may read from and/or write to the L2 cache 424 when executing the commands of the frame N+1 commands and data 412.

The system memory 406 may be memory that is external to the GPU 404. The system memory 406 may include cross-core carveout memory 426 that is accessible to/by the first GPU pipeline core 414 and the second GPU pipeline core 416. The cross-core carveout memory 426 may be referred to as a shared resource between the first GPU pipeline core 414 and the second GPU pipeline core 416. In one aspect, the cross-core carveout memory 426 may store a shared resource between the first GPU pipeline core 414 and the second GPU pipeline core 416.

In an example, the first GPU pipeline core 414 may execute commands of the frame N commands and data 410 to generate frame N final display buffers 428 in the L2 cache 424, whereupon the frame N final display buffers 428 may be transferred to the system memory 406. The frame N final display buffers 428 (or a portion thereof) may also be transferred back to the L2 cache 424 as part of execution of other commands. In an example, the second GPU pipeline core 416 may execute commands of the frame N+1 commands and data 412 to generate frame N+1 final display buffers 430 in the L2 cache 424, whereupon the frame N+1 final display buffers 430 may be transferred to the system memory 406. The frame N+1 final display buffers 430 (or a portion thereof) may also be transferred back to the L2 cache 424 as part of execution of other commands. The frame N final display buffers 428 may be transmitted to a display for presentation of a final N frame on the display. Subsequently, the frame N+1 final display buffers 430 may be transmitted to the display for presentation of a final N+1 frame on the display.

Figure 5:
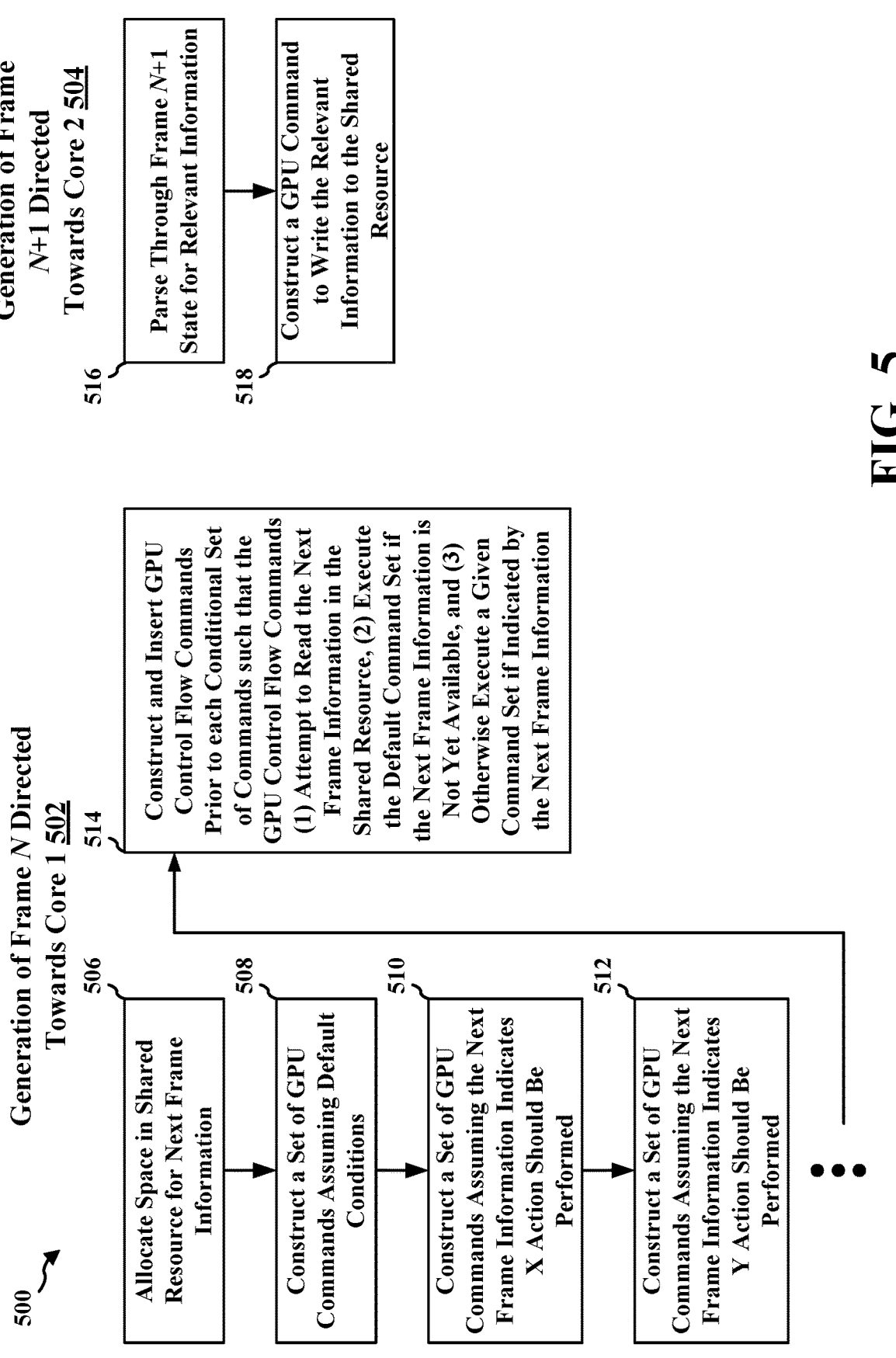
FIG. 5 is a diagram illustrating an example of generation of frame N directed towards a first core and an example of generation of frame N+1 directed towards a second core in accordance with one or more techniques of this disclosure.

FIG. 5 is a diagram 500 illustrating an example of generation of frame N directed towards a first core 502 and an example of generation of frame N+1 directed towards second core 504 in accordance with one or more techniques of this disclosure. As indicated above, gaining knowledge of future work related to a frame may not be feasible at a CPU due to the sequential processing nature of the CPU. However, a multicore GPU (e.g., the GPU 404) may begin working on a later frame while still processing an earlier frame, even if the earlier frame and the later frame were submitted sequentially by a GPU driver (e.g., the GPU driver 408). For instance, the first GPU pipeline core 414 may receive the frame N commands and data 410 at a first time instance. The first GPU pipeline core 414 may then begin to perform processing with respect to the frame N commands and data 410. The second GPU pipeline core 416 may receive the frame N+1 commands and data 412 at a second time instance that occurs after the first time instance. The second GPU pipeline core 416 may then begin to perform processing with respect to the frame N+1 commands and data 412, even if the first GPU pipeline core 414 has not yet completed the processing with respect to the frame N commands and data 410. Stated differently, the first GPU pipeline core 414 and the second GPU pipeline core 416 may perform processing with respect to the frame N commands and data 410 and the frame N+1 commands and data 412 entirely or partially in parallel. For instance, a third time instance may exist between the first time instance and the second time instance in which the first GPU pipeline core 414 performs processing with respect to the frame N commands and data 410 while the second GPU pipeline core 416 performs processing with respect to the frame N+1 commands and data 412.

A shared resource may be shared between some or all cores of a GPU. For instance, a shared resource may be shared between the first GPU pipeline core 414 and the second GPU pipeline core 416. Examples of shared resources will be described in greater detail below. The shared resource may provide an opportunity for the first GPU pipeline core 414 and the second GPU pipeline core 416 to communicate information to one another, that is, two frames may communicate information to one another in a portion of time corresponding to overlapped processing of the first GPU pipeline core 414 and the second GPU pipeline core 416. In one aspect described herein, work associated with frame N (e.g., commands of the frame N commands and data 410) that has yet to execute in the portion of time may be dynamically altered based on information shared by work (e.g., commands of the frame N+1 commands and data 412) that has already been executed for frame N+1. Such a process may be performed on a GPU (e.g., the GPU 404). The process may be orchestrated by a GPU driver (e.g., the GPU driver 408) by embedding logic in a GPU command stream for a respective GPU core during a processing time associated with each frame.

With respect to the generation of frame N directed towards the first core 502, at 506, a GPU driver (e.g., the GPU driver 408) may allocate space in a shared resource for next frame information to be stored. At 508, the GPU driver may construct a set of GPU commands assuming default conditions, that is, the GPU driver may construct a set of GPU commands that are to be executed under default conditions. At 510, the GPU driver may construct a set of GPU commands assuming that the next frame information indicates that X action should be performed, that is, the GPU driver may construct a set of GPU commands that are to be executed if the next frame information indicates that X action should be performed. At 512, the GPU driver may construct a set of GPU commands assuming that the next frame information indicates that Y action should be performed, that is, the GPU driver may construct a set of GPU commands that are to be executed if the next frame information indicates that Y action should be performed. The GPU driver may repeat 506, 508, 510, and 512 for a number of possible actions based on the next frame information. At 514, the GPU driver may construct and insert GPU control flow commands prior to each condition set of commands (e.g., the set of commands constructed at 508, 510, and/or 512) such that the GPU control flow commands: (1) attempt to read the next frame information in the shared resource, (2) execute the default command set (e.g., the command set constructed at 512) if the next frame information is not yet available (e.g., due to low parallelization), and (3) otherwise execute a given command set (e.g., the set of commands constructed at 510 or 512) if indicated by the next frame information.

With respect to the generation of frame N+1 directed towards the second core 504, at 516, the GPU driver may parse through a state of frame N+1 for relevant information. For instance, a piece or multiple pieces of a state available during a driver generation of frame N+1 may reference how the state from frame N to frame N+1 has evolved (e.g., a resource is no longer being used, a resource has had its contents updated, a particular application programming interface (API) feature has been toggled, etc.). In an example, relevant information may include graphics resources that have clear/discard commands associated with frame N+1. At 518, the GPU driver may construct a GPU command that writes the relevant information to the space in the shared resource allocated at 506.

Figure 6:
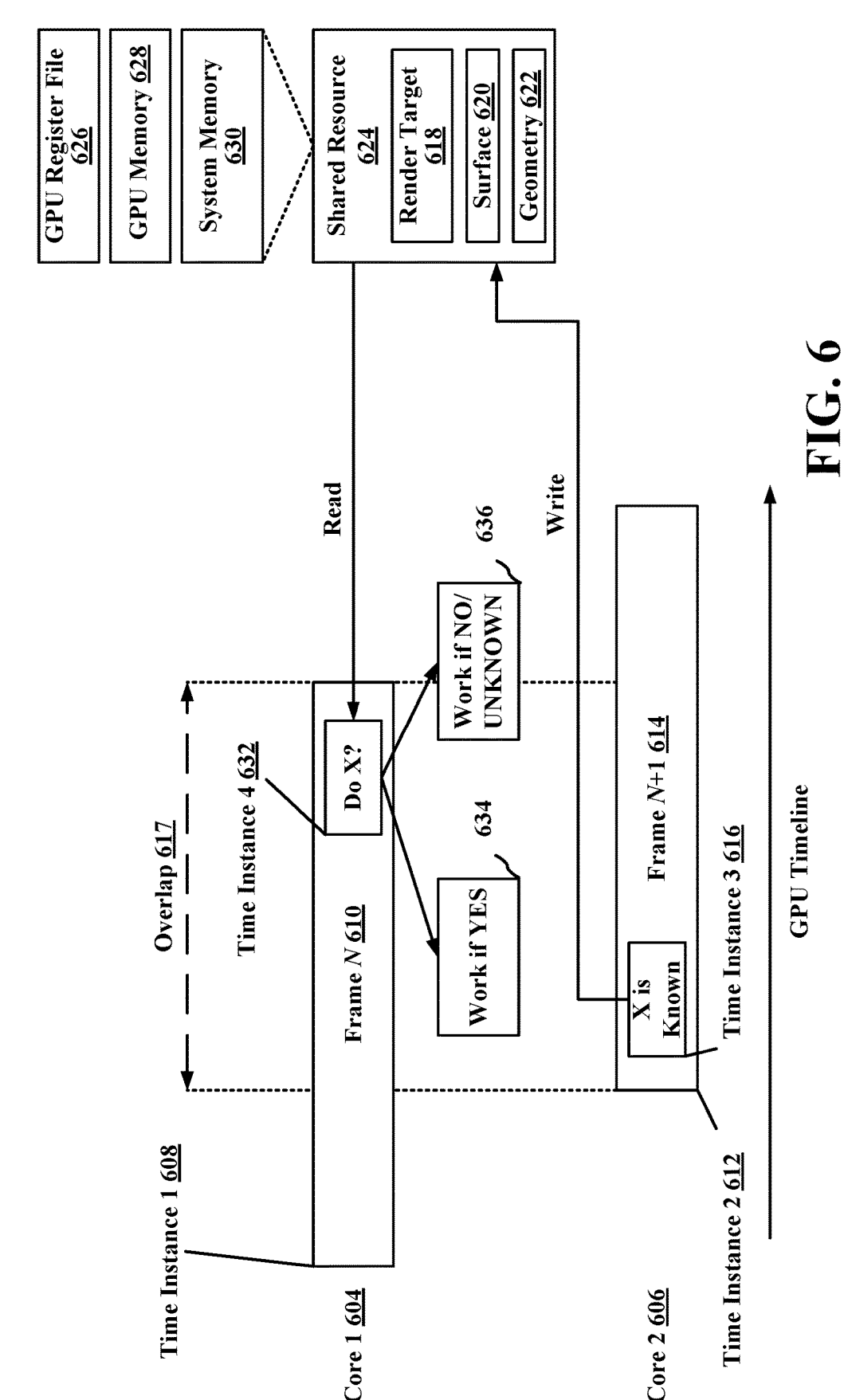
FIG. 6 is a diagram illustrating an example of multicore cross-frame optimization between a first core and a second core in accordance with one or more techniques of this disclosure.

FIG. 6 is a diagram 600 illustrating an example of multicore cross-frame optimization 602 between a first core 604 and a second core 606 in accordance with one or more techniques of this disclosure. In an example, the first core 604 may be, include, or be associated with the first GPU pipeline core 414. In an example, the second core 606 may be, include, or be associated with the second GPU pipeline core 416. In one aspect, the first core 604 may be a primary core and the second core 606 may be a secondary core, where the primary core may be responsible for performing a relatively greater computationally workload than a computational workload performed by the secondary core. The multicore cross-frame optimization may be an example of the processes described above with respect to FIG. 5.

At a first time instance 608, the first core 604 may begin to perform processing with respect to frame N 610. In an example, frame N 610 may be associated with the frame N commands and data 410. At a second time instance 612 that occurs after the first time instance 608, the second core 606 may begin to perform processing with respect to frame N+1 614. In an example, frame N+1 614 may be associated with the frame N+1 commands and data 412. As depicted in the diagram 600, there is an overlap 617 in time between the processing of frame N 610 and frame N+1 614, that is, a portion of the processing associated with frame N 610 and a portion of the processing associated with frame N+1 614 may be performed concurrently.

In an example, at a third time instance 616 that occurs after the second time instance 612, the second core 606 may execute command(s) (e.g., a first command in the frame N+1 commands and data 412) that causes "X" (e.g., relevant information) to be known (or generated). In an example, "X" may be a render target 618, a surface 620, or geometry 622. A render target may refer to a resource into which primitives are rasterized and shaded (e.g., a frame buffer or texture map). For instance, a render target may be a section of memory in which the next frame to be displayed is drawn. In an example, the surface 620 may be a texture. Based on the command(s) (e.g., a second command in the frame N+1 commands and data 412), the second core 606 may write "X" to a shared resource 624 that is shared between the first core 604 and the second core 606, that is, the first core 604 and the second core 606 may read from and/or write to the shared resource 624. In an example, the shared resource 624 may be or include a GPU register file 626 (e.g., the GPU register file 422), GPU memory 628 (e.g., the cross-core carveout memory 420), and/or system memory 630 (e.g., the cross-core carveout memory 426).

At a fourth time instance 632 that occurs after the third time instance 616, the first core 604 may execute command(s) (e.g., a first command in the frame N commands and data 410) that causes the first core 604 to read "X" from the shared resource 624. In an example, based on the "X" being successfully read from the shared resource 624, at 634, based on the command(s) (e.g., a second command in the frame N commands and data 410), the first core 604 may perform certain work. In an example, if the second core 606 discards "X" after writing "X" to the shared resource 624 (and hence has no use for "X" in the future), the work performed at 634 may entail preventing "X" from being stored to on-chip or off-chip memory, which may conserve power and reduce overhead computational costs. In another example, the work at 634 may entail performing optimizations associated with "X." In an example, 634 may correspond to 510 in FIG. 5. Alternatively, if "X" was not successfully read from the shared resource 624 (e.g., due to "X" not being stored in the shared resource 624 or due to the first core 604 not being able to ascertain whether or not "X" is stored in the shared resource 624), at 636, the first core 604 may perform different work. In an example, the work performed at 636 may entail storing "X" in on-chip or off-chip memory. In an example, 636 may correspond to 508 or 512 in FIG. 5.

Figure 7:
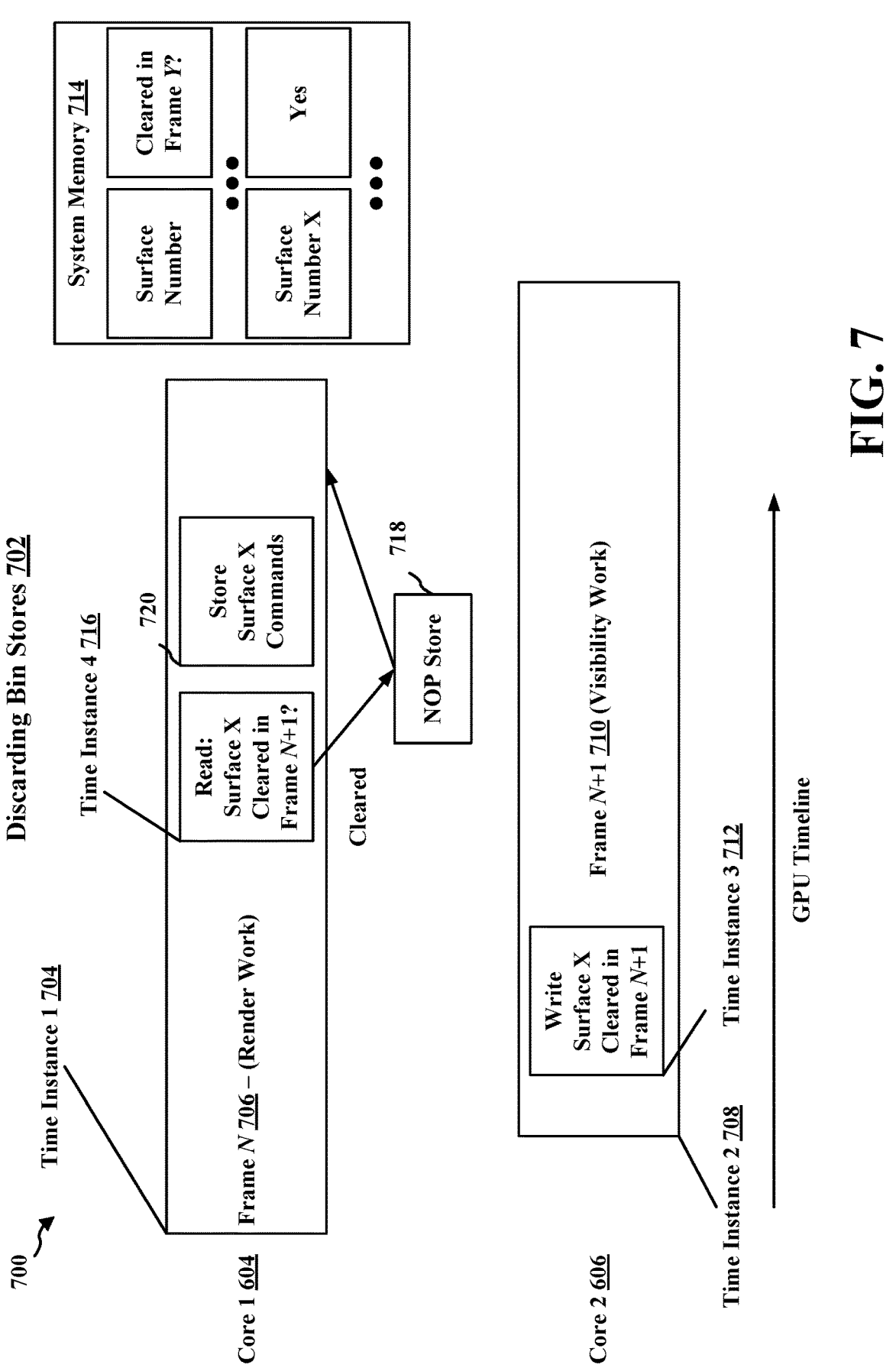
FIG. 7 is a diagram illustrating an example of discarding bin stores in accordance with one or more techniques of this disclosure.

FIG. 7 is a diagram 700 illustrating an example of discarding bin stores 702 in accordance with one or more techniques of this disclosure. At a first time instance 704, the first core 604 may begin to perform processing with respect to frame N 706. In an example, the processing with respect to frame N 706 may be associated with render work (e.g., rasterization) for frame N 706. The render work may also be referred to as a rendering workload. A rendering workload may refer to a workload performed to render graphical content. In an example, frame N 706 may be associated with the frame N commands and data 410.

At a second time instance 708 that occurs after the first time instance 704, the second core 606 may begin to perform processing with respect to frame N+1 710. In an example, the processing with respect to frame N+1 710 may be associated with visibility work for frame N+1 710. The visibility work may be referred to a visibility workload. A visibility workload may refer to a workload performed to determine visible elements in graphic content prior to an associated rendering workload being performed. In an example, a visibility workload may be executed in order to cull non-visible elements in graphical content. At a third time instance 712 that occurs after the second time instance 708, the second core 606 may execute command(s) (e.g., a first command in the frame N+1 commands and data 412) that writes a surface X and clears the surface X in frame N+1 710. The command(s) may cause the second core 606 to update system memory 714 (e.g., the system memory 406, the system memory 630, etc.) to include an indication of surface X and an indication that surface X was cleared in frame Y (e.g., frame N+1 710).

At a fourth time instance 716 that occurs after the third time instance 712, the first core 604 may execute command(s) (e.g., a first command in the frame N commands and data 410) that causes the first core 604 to read the system memory 714 in order to determine whether or not surface X was cleared in frame N+1 710. In an example, the first core 604 may read the system memory 714 and the first core 604 may determine that surface X was cleared in frame N+1 710. In the example, at 718, the first core 604 may perform a no operation (NOP) that causes surface X to be discarded. Alternatively, if the first core 604 determines that surface X was not cleared in frame N+1 710, at 720, the first core 604 may store surface X commands.

Figure 8:
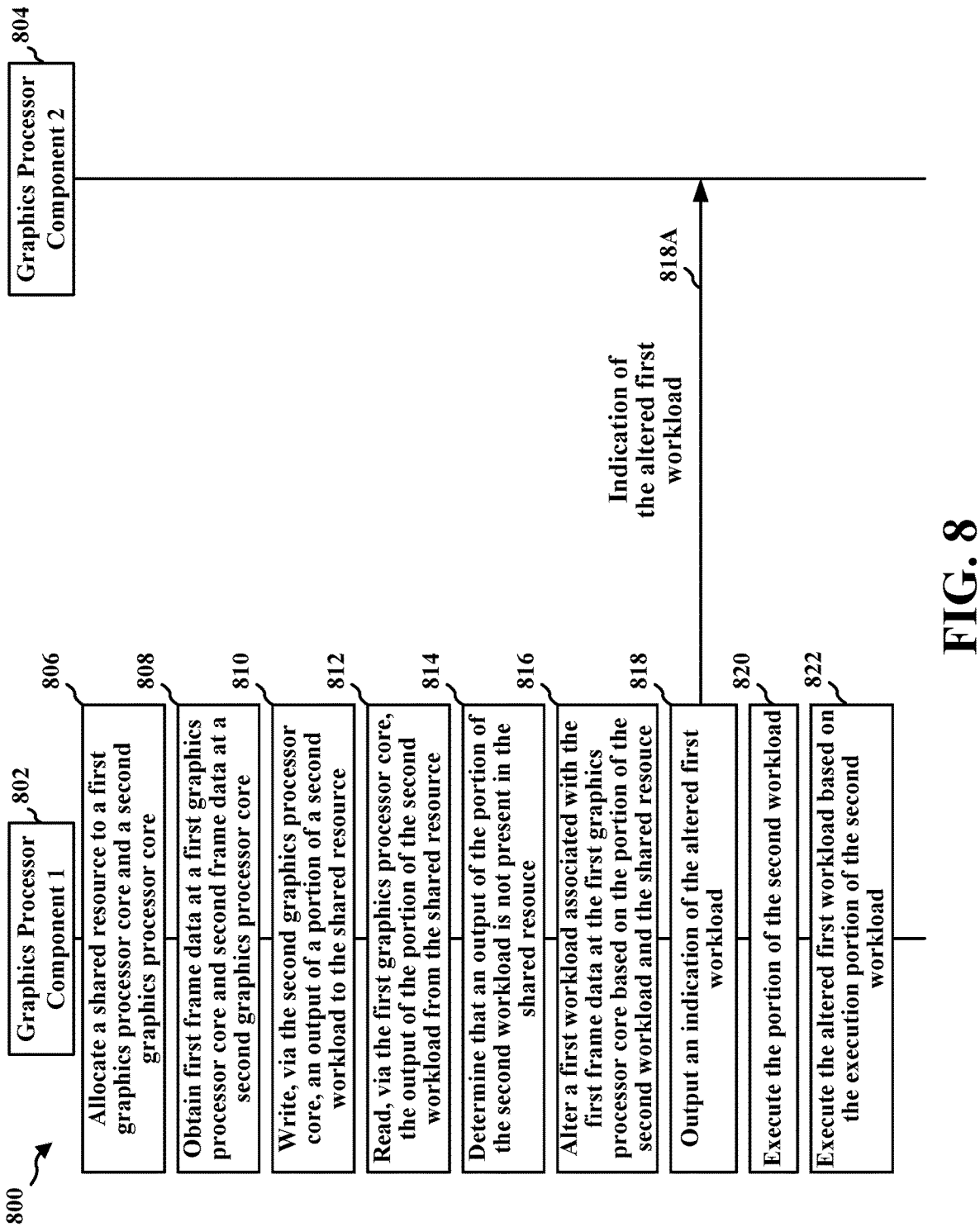
FIG. 8 is a call flow diagram illustrating example communications between a first graphics processor component and a second graphics processor component in accordance with one or more techniques of this disclosure.

FIG. 8 is a call flow diagram 800 illustrating example communications between a first graphics processor component 802 and a second graphics processor component 804 in accordance with one or more techniques of this disclosure. In an example, the first graphics processor component 802 and the second graphics processor component 804 may be included in the device 104. In one aspect, the first graphics processor component 802 and/or the second graphics processor component 804 may be or include a GPU driver executed by a CPU. In another aspect, the first graphics processor component 802 and/or the second graphics processor component 804 may be or include a GPU.

At 808, the first graphics processor component 802 may obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. At 816, the first graphics processor component 802 may alter a first workload associated with the first frame data at the first graphics processor core based on (1) a portion of a second workload for the second frame data that has been previously executed by the second graphics processor core and (2) a shared resource between the first graphics processor core and the second graphics processor core. At 818, the first graphics processor component 802 may output an indication of the altered first workload. For instance, at 818A, the first graphics processor component 802 may transmit (e.g., to the second graphics processor component 804) an indication of the altered first workload.

At 820, the first graphics processor component 802 may execute the portion of the second workload. At 822, the first graphics processor component 802 may execute the altered first workload based on the executed portion of the second workload.

At 806, the first graphics processor component 802 may allocate the shared resource to the first graphics processor core and the second graphics processor core, where altering the first workload based on the portion of the second workload and the shared resource at 816 may include altering the first workload based on the portion of the second workload and the allocated shared resource. At 810, the first graphics processor component 802 may write, via the second graphics processor core, an output of the portion of the second workload to the shared resource. At 812, the first graphics processor component 802 may read, via the first graphics processor core, the output of the portion of the second workload from the shared resource, where altering the first workload based on the portion of the second workload and the shared resource at 816 may include altering the first workload further based on the output of the portion of the second workload. At 814, the first graphics processor component 802 may determine that an output of the portion of the second workload is not present in the shared resource, and where altering the first workload at 816 may include utilizing a default workload based on the determination.

FIG. 9 is a flowchart 900 of an example method of graphics processing in accordance with one or more techniques of this disclosure. The method may be performed by an apparatus, such as an apparatus for graphics processing, a GPU (e.g., the GPU 404), a CPU, GPU driver software executed by a CPU, the device 104, a wireless communication device, and the like, as used in connection with the aspects of FIGS. 1-8. In an example, the method may be performed by the workload optimizer 198.

At 902, the apparatus obtains first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. For example, FIG. 8 at 808 shows that the first graphics processor component 802 may obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. In an example, the graphics processor may be included in the device 104 (e.g., in the processing unit 120). In an example, the graphics processor may be the GPU 404. In an example, the first graphics processor core may be associated with the first GPU pipeline core 414 and the second graphics processor core may be associated with the second GPU pipeline core 416. In an example, the first graphics processor core may be the first core 604 and the second graphics processor core may be the second core 606. In an example, the first frame data may correspond to frame N 610 and the second frame data may correspond to frame N+1 614. In an example, the first time instance may be the first time instance 608 and the second time instance may be the second time instance 612. In another example, the first time instance may be the first time instance 704 and the second time instance may be the second time instance 708. In an example, the first frame data may be associated with the frame N commands and data 410 in FIG. 4 and the second frame data may be associated with the frame N+1 commands and data 412 in FIG. 4. In an example, 902 may be performed by the workload optimizer 198.

At 904, the apparatus alters a first workload associated with the first frame data at the first graphics processor core based on (1) a portion of a second workload for the second frame data that has been previously executed by the second graphics processor core and (2) a shared resource between the first graphics processor core and the second graphics processor core. For example, FIG. 8 at 816 shows that the first graphics processor component 802 may alter a first workload associated with the first frame data at the first graphics processor core based on (1) a portion of a second workload for the second frame data that has been previously executed by the second graphics processor core and (2) a shared resource between the first graphics processor core and the second graphics processor core. In an example, the first workload may correspond to 634 or 636 in FIG. 6 and the second workload may correspond to "X is Known" in FIG. 6. In another example, the first workload may correspond to 718 or 720 in FIG. 7 and the second workload may correspond to "Write Surface X Cleared in Frame N+1" in FIG. 7. In an example, altering the first workload may correspond to 514 in FIG. 5. In an example, the first workload may correspond to frame N commands and data 410 in FIG. 4 and the second workload may correspond to frame N+1 commands and data 412 in FIG. 4. In an example, the shared resource may include or may be associated with the GPU register file 422, the cross-core carveout memory 420, or the cross-core carveout memory 426. In an example, the shared resource may include or may be associated with the shared resource 624. In an example, 904 may be performed by the workload optimizer 198.

At 906, the apparatus outputs an indication of the altered first workload. For example, FIG. 8 at 818 shows that the first graphics processor component 802 may output an indication of the altered first workload. In an example, 906 may be performed by the workload optimizer 198.

FIG. 10 is a flowchart 1000 of an example method of graphics processing in accordance with one or more techniques of this disclosure. The method may be performed by an apparatus, such as an apparatus for graphics processing, a GPU (e.g., the GPU 404), a CPU, GPU driver software executed by a CPU, the device 104, a wireless communication device, and the like, as used in connection with the aspects of FIGS. 1-8. In an example, the method (including the various aspects detailed below) may be performed by the workload optimizer 198.

At 1004, the apparatus obtains first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. For example, FIG. 8 at 808 shows that the first graphics processor component 802 may obtain first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. In an example, the graphics processor may be included in the device 104 (e.g., in the processing unit 120). In an example, the graphics processor may be the GPU 404. In an example, the first graphics processor core may be associated with the first GPU pipeline core 414 and the second graphics processor core may be associated with the second GPU pipeline core 416. In an example, the first graphics processor core may be the first core 604 and the second graphics processor core may be the second core 606. In an example, the first frame data may correspond to frame N 610 and the second frame data may correspond to frame N+1 614. In an example, the first time instance may be the first time instance 608 and the second time instance may be the second time instance 612. In another example, the first time instance may be the first time instance 704 and the second time instance may be the second time instance 708. In an example, the first frame data may be associated with the frame N commands and data 410 in FIG. 4 and the second frame data may be associated with the frame N+1 commands and data 412 in FIG. 4. In an example, 1004 may be performed by the workload optimizer 198.

At 1012, the apparatus alters a first workload associated with the first frame data at the first graphics processor core based on (1) a portion of a second workload for the second frame data that has been previously executed by the second graphics processor core and (2) a shared resource between the first graphics processor core and the second graphics processor core. For example, FIG. 8 at 816 shows that the first graphics processor component 802 may alter a first workload associated with the first frame data at the first graphics processor core based on (1) a portion of a second workload for the second frame data that has been previously executed by the second graphics processor core and (2) a shared resource between the first graphics processor core and the second graphics processor core. In an example, the first workload may correspond to 634 or 636 in FIG. 6 and the second workload may correspond to "X is Known" in FIG. 6. In another example, the first workload may correspond to 718 or 720 in FIG. 7 and the second workload may correspond to "Write Surface X Cleared in Frame N+1" in FIG. 7. In an example, altering the first workload may correspond to 514 in FIG. 5. In an example, the first workload may correspond to frame N commands and data 410 in FIG. 4 and the second workload may correspond to frame N+1 commands and data 412 in FIG. 4. In an example, the shared resource may include or may be associated with the GPU register file 422, the cross-core carveout memory 420, or the cross-core carveout memory 426. In an example, the shared resource may include or may be associated with the shared resource 624. In an example, 1012 may be performed by the workload optimizer 198.

At 1014, the apparatus outputs an indication of the altered first workload. For example, FIG. 8 at 818 shows that the first graphics processor component 802 may output an indication of the altered first workload. In an example, 1014 may be performed by the workload optimizer 198.

In one aspect, at 1016, the apparatus may execute the portion of the second workload. For example, FIG. 8 at 820 shows that the first graphics processor component 802 may execute the portion of the second workload. In an example, executing the portion of the second workload may correspond to "X is known" in FIG. 6. In another example, executing the portion of the second workload may correspond to "Write Surface X Cleared in Frame N+1" in FIG. 7. In an example, 1016 may be performed by the workload optimizer 198.

In one aspect, at 1018, the apparatus may execute the altered first workload based on the executed portion of the second workload. For example, FIG. 8 at 822 shows that the first graphics processor component 802 may execute the altered first workload based on the executed portion of the second workload. In an example, executing the altered first workload may be associated with "Do X?" in FIG. 6. In another example, executing the altered first workload may correspond to 634 or 636 in FIG. 6. In yet another example, executing the altered first workload may correspond to 718 or 720 in FIG. 7. In an example, 1018 may be performed by the workload optimizer 198.

In one aspect, executing the altered first workload may include executing a portion of the altered first workload in parallel with the execution of the portion of the second workload. For example, executing the altered first workload at 822 may include executing a portion of the altered first workload in parallel with the execution of the portion of the second workload. In an example, FIG. 6 shows that executing the altered first workload may include executing a portion of the altered first workload in parallel with the execution of the portion of the second workload. In another example, FIG. 7 shows that executing the altered first workload may include executing a portion of the altered first workload in parallel with the execution of the portion of the second workload.

In one aspect, obtaining the first frame data at the first graphics processor core of the graphics processor and the second frame data at the second graphics processor core of the graphics processor may include obtaining the first frame data and the second frame data sequentially from a graphics processor driver executed by a central processing unit (CPU). For example, obtaining the first frame data at the first graphics processor core of the graphics processor and the second frame data at the second graphics processor core of the graphics processor at 808 may include obtaining the first frame data and the second frame data sequentially from a graphics processor driver executed by a central processing unit (CPU). In an example, the CPU may be the CPU 402 and the graphics processor driver may be the GPU driver 408.

In one aspect, the shared resource may include or may be associated with at least one of a graphics processor register file, first data stored in graphics processor memory, a render target, a surface, or second data stored in system memory. For example, the shared resource may include or may be associated with the GPU register file 422, the cross-core carveout memory 420, the cross-core carveout memory 426, the shared resource 624, the render target 618, the surface 620, the geometry 622, the GPU register file 626, the GPU memory 628, or the system memory 630.

In one aspect, the first workload and the first graphics processor core may be associated with a first rendering workload, where the second graphics processor core and the second workload may be associated with a visibility workload, where the visibility workload may be associated with a second rendering workload, and where altering the first workload may include altering the first rendering workload based on the visibility workload. For example, the aforementioned aspect may correspond to the render work and the visibility work described in the description of FIG. 7.

In one aspect, at 1002, the apparatus may allocate the shared resource to the first graphics processor core and the second graphics processor core, where altering the first workload based on the portion of the second workload and the shared resource may include altering the first workload based on the portion of the second workload and the allocated shared resource. For example, FIG. 8 at 806 shows that the first graphics processor component 802 may allocate the shared resource to the first graphics processor core and the second graphics processor core, where altering the first workload based on the portion of the second workload and the shared resource at 816 may include altering the first workload based on the portion of the second workload and the allocated shared resource. In an example, the aforementioned aspect may correspond to 506 in FIG. 5. In an example, 1002 may be performed by the workload optimizer 198.

In one aspect, at 1006, the apparatus may write, via the second graphics processor core, an output of the portion of the second workload to the shared resource. For example, FIG. 8 at 810 shows that the first graphics processor component 802 may write, via the second graphics processor core, an output of the portion of the second workload to the shared resource. In an example, the output of the portion of the second workload may correspond to writing "X" to the shared resource 624 in FIG. 6. In an example, 1006 may be performed by the workload optimizer 198.

In one aspect, at 1008, the apparatus may read, via the first graphics processor core, the output of the portion of the second workload from the shared resource, where altering the first workload based on the portion of the second workload and the shared resource may include altering the first workload further based on the output of the portion of the second workload. For example, FIG. 8 at 812 shows that the first graphics processor component 802 may read, via the first graphics processor core, the output of the portion of the second workload from the shared resource, where altering the first workload based on the portion of the second workload and the shared resource at 816 may include altering the first workload further based on the output of the portion of the second workload. In an example, reading the output of the portion of the second workload from the shared resource may correspond to reading "X" from the shared resource 624 in FIG. 6. In an example, 1008 may be performed by the workload optimizer 198.

In one aspect, an output of the portion of the second workload may indicate that an output of the first workload is to be utilized by the second workload, and where altering the first workload may include storing the output of the first workload on-chip at the graphics processor after an execution of the first workload. For example, altering the first workload at 816 may include storing the output of the first workload on-chip at the graphics processor after an execution of the first workload. In an example, storing the output of the first workload on-chip at the graphics processor may correspond to storing the output in the GPU memory 418 or in the cross-core carveout memory 420 of the GPU memory 418. In an example, the aforementioned aspect may correspond to 720 in FIG. 7.

In one aspect, an output of the portion of the second workload may indicate that that an output of the first workload is not to be utilized by the second workload, and where altering the first workload may include discarding the output of the first workload after an execution of the first workload. For example, altering the first workload at 816 may include discarding the output of the first workload after an execution of the first workload. In an example, the aforementioned aspect may correspond to 718 in FIG. 7.

In one aspect, the first graphics processor core may include first characteristics and the second graphics processor core may include second characteristics, and where the first characteristics are different from the second characteristics. For example, the first core 604 may include first characteristics and the second core 606 may include second characteristics where the first characteristics are different from the second characteristics.

In one aspect, at least one of the first frame data or the first workload may include a first set of commands for a generation of a first frame, where at least one of the second frame data or the second workload may include a second set of commands for a generation of the second frame, and where the first frame may be prior to the second frame. For example, the first set of commands may correspond to the frame N commands and data 410 and the second set of commands may correspond to the frame N+1 commands and data 412.

In one aspect, the first workload and the second workload may be associated with a same real-world timestamp, where the first workload may be associated with a first application timestamp of an application and the second workload may be associated with a second application timestamp of the application, and where the first application timestamp may be different from the second application timestamp. For example, at 816, the first workload and the second workload may be associated with a same real-world timestamp, where the first workload may be associated with a first application timestamp of an application and the second workload may be associated with a second application timestamp of the application, and where the first application timestamp may be different from the second application timestamp.

In one aspect, at 1010, the apparatus may determine that an output of the portion of the second workload is not present in the shared resource, and where altering the first workload may include utilizing a default workload based on the determination. For example, FIG. 8 at 814 shows that the first graphics processor component 802 may determine that an output of the portion of the second workload is not present in the shared resource, and where altering the first workload at 816 may include utilizing a default workload based on the determination. In an example, the aforementioned aspect may correspond to (2) in 514 in FIG. 5. In an example, 1010 may be performed by the workload optimizer 198.

In one aspect, outputting the indication of the altered first workload may include: storing the indication of the altered first workload in at least one of a memory, a buffer, or a cache; or transmitting the indication of the altered first workload. For example, outputting the indication of the altered first workload at 818 may include: storing the indication of the altered first workload in at least one of a memory, a buffer, or a cache. In another example, FIG. 8 at 818A shows that outputting the indication of the altered first workload may include transmitting the indication of the altered first workload.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining first frame data at a first graphics processor core of a graphics processor and second frame data at a second graphics processor core of the graphics processor, where the first frame data is associated with a first time instance and the second frame data is associated with a second time instance, and where the first time instance is prior to the second time instance. The apparatus may further include means for altering a first workload associated with the first frame data at the first graphics processor core based on (1) a portion of a second workload for the second frame data that has been previously executed by the second graphics processor core and (2) a shared resource between the first graphics processor core and the second graphics processor core. The apparatus may further include means for outputting an indication of the altered first workload. The apparatus may further include means for executing the portion of the second workload. The apparatus may further include means for executing the altered first workload based on the executed portion of the second workload. The apparatus may further include means for allocating the shared resource to the first graphics processor core and the second graphics processor core, where altering the first workload based on the portion of the second workload and the shared resource includes altering the first workload based on the portion of the second workload and the allocated shared resource. The apparatus may further include means for writing, via the second graphics processor core, an output of the portion of the second workload to the shared resource. The apparatus may further include means for reading, via the first graphics processor core, the output of the portion of the second workload from the shared resource, where altering the first workload based on the portion of the second workload and the shared resource includes altering the first workload further based on the output of the portion of the second workload. The apparatus may further include means for determining that an output of the portion of the second workload is not present in the shared resource, and where altering the first workload includes utilizing a default workload based on the determination.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: obtaining first frame data at a first graphics processor core of a graphics processor and second frame data at a second graphics processor core of the graphics processor, wherein the first frame data is associated with a first time instance and the second frame data is associated with a second time instance, and wherein the first time instance is prior to the second time instance; altering a first workload associated with the first frame data at the first graphics processor core based on (1) a portion of a second workload for the second frame data that has been previously executed by the second graphics processor core and (2) a shared resource between the first graphics processor core and the second graphics processor core; and outputting an indication of the altered first workload.

Aspect 2 may be combined with aspect 1, further including: executing the portion of the second workload; and executing the altered first workload based on the executed portion of the second workload.

Aspect 3 may be combined with aspect 2, wherein executing the altered first workload includes executing a portion of the altered first workload in parallel with the execution of the portion of the second workload.

Aspect 4 may be combined with any of aspects 1-3, wherein obtaining the first frame data at the first graphics processor core of the graphics processor and the second frame data at the second graphics processor core of the graphics processor includes obtaining the first frame data and the second frame data sequentially from a graphics processor driver executed by a central processing unit (CPU).

Aspect 5 may be combined with any of aspects 1-4, wherein the shared resource includes or is associated with at least one of a graphics processor register file, first data stored in graphics processor memory, a render target, a surface, or second data stored in system memory.

Aspect 6 may be combined with any of aspects 1-5, wherein the first workload and the first graphics processor core are associated with a first rendering workload, wherein the second graphics processor core and the second workload are associated with a visibility workload, wherein the visibility workload is associated with a second rendering workload, and wherein altering the first workload includes altering the first rendering workload based on the visibility workload.

Aspect 7 may be combined with any of aspects 1-6, further including: allocating the shared resource to the first graphics processor core and the second graphics processor core, wherein altering the first workload based on the portion of the second workload and the shared resource includes altering the first workload based on the portion of the second workload and the allocated shared resource.

Aspect 8 may be combined with any of aspects 1-7, further including: writing, via the second graphics processor core, an output of the portion of the second workload to the shared resource; and reading, via the first graphics processor core, the output of the portion of the second workload from the shared resource, wherein altering the first workload based on the portion of the second workload and the shared resource includes altering the first workload further based on the output of the portion of the second workload.

Aspect 9 may be combined with any of aspects 1-8, wherein an output of the portion of the second workload indicates that an output of the first workload is to be utilized by the second workload, and wherein altering the first workload includes storing the output of the first workload on-chip at the graphics processor after an execution of the first workload.

Aspect 10 may be combined with any of aspects 1-8, wherein an output of the portion of the second workload indicates that that an output of the first workload is not to be utilized by the second workload, and wherein altering the first workload includes discarding the output of the first workload after an execution of the first workload.

Aspect 11 may be combined with any of aspects 1-10, wherein the first graphics processor core includes first characteristics and the second graphics processor core includes second characteristics, and wherein the first characteristics are different from the second characteristics.

Aspect 12 may be combined with any of aspects 1-11, wherein at least one of the first frame data or the first workload includes a first set of commands for a generation of a first frame, wherein at least one of the second frame data or the second workload includes a second set of commands for a generation of the second frame, and wherein the first frame is prior to the second frame.

Aspect 13 may be combined with any of aspects 1-12, wherein the first workload and the second workload are associated with a same real-world timestamp, wherein the first workload is associated with a first application timestamp of an application and the second workload is associated with a second application timestamp of the application, and wherein the first application timestamp is different from the second application timestamp.

Aspect 14 may be combined with any of aspects 1-8 and 11-13, further including: determining that an output of the portion of the second workload is not present in the shared resource, and wherein altering the first workload includes utilizing a default workload based on the determination.

Aspect 15 may be combined with any of aspects 1-14, wherein outputting the indication of the altered first workload includes: storing the indication of the altered first workload in at least one of a memory, a buffer, or a cache; or transmitting the indication of the altered first workload.

Aspect 16 is an apparatus for graphics processing including a memory and a processor coupled to the memory and, based on information stored in the memory, the processor is configured to implement a method as in any of aspects 1-15.

Aspect 17 may be combined with aspect 16 and includes that the apparatus is a wireless communication device comprising at least one of a transceiver or an antenna coupled to the processor.

Aspect 18 is an apparatus for graphics processing including means for implementing a method as in any of aspects 1-15.

Aspect 19 is a computer-readable medium (e.g., a non-transitory computer-readable storage medium) storing computer executable code, the computer executable code, when executed by a processor, causes the processor to implement a method as in any of aspects 1-15.

Various aspects have been described herein. These and other aspects are within the scope of the following claims.

What is claimed is:

1. An apparatus for graphics processing, comprising:
a memory; and
a processor coupled to the memory and, based on information stored in the memory, the processor is configured to:
obtain first frame data at a first graphics processor core of a graphics processor and second frame data at a second graphics processor core of the graphics processor, wherein the first frame data is associated with a first time instance and the second frame data is associated with a second time instance, and wherein the first time instance is prior to the second time instance;
alter a first workload associated with the first frame data at the first graphics processor core based on (1) an output of a portion of a second workload for the second frame data and (2) a shared resource between the first graphics processor core and the second graphics processor core; and
output an indication of the altered first workload.

2. The apparatus of claim 1, wherein the processor is further configured to:
execute the portion of the second workload to produce the output of the portion of the second workload; and
execute the altered first workload based on the executed portion of the second workload.

3. The apparatus of claim 2, wherein to execute the altered first workload, the processor is configured to execute a portion of the altered first workload in parallel with the execution of the portion of the second workload.

4. The apparatus of claim 1, wherein to obtain the first frame data at the first graphics processor core of the graphics processor and the second frame data at the second graphics processor core of the graphics processor, the processor is configured to obtain the first frame data and the second frame data sequentially from a graphics processor driver executed by a central processing unit (CPU).

5. The apparatus of claim 1, wherein the shared resource comprises or is associated with at least one of a graphics processor register file, first data stored in graphics processor memory, a render target, a surface, or second data stored in system memory.

6. The apparatus of claim 1, wherein the first workload and the first graphics processor core are associated with a first rendering workload, wherein the second graphics processor core and the second workload are associated with a visibility workload, wherein the visibility workload is associated with a second rendering workload, and wherein to alter the first workload, the processor is configured to alter the first rendering workload based on an output of the visibility workload.

7. The apparatus of claim 1, wherein the processor is further configured to:
allocate the shared resource to the first graphics processor core and the second graphics processor core, wherein to alter the first workload based on the portion of the second workload and the shared resource, the processor is configured to alter the first workload based on the output of the portion of the second workload and the allocated shared resource.

8. The apparatus of claim 1, wherein the processor is further configured to:
write, via the second graphics processor core, the output of the portion of the second workload to the shared resource; and
read, via the first graphics processor core, the output of the portion of the second workload from the shared resource.

9. The apparatus of claim 1, wherein the output of the portion of the second workload indicates that an output of the first workload is to be utilized by the second workload, and wherein to alter the first workload, the processor is configured to store the output of the first workload on-chip at the graphics processor after an execution of the first workload.

10. The apparatus of claim 1, wherein the output of the portion of the second workload indicates that that an output of the first workload is not to be utilized by the second workload, and wherein to alter the first workload, the processor is configured to discard the output of the first workload after an execution of the first workload.

11. The apparatus of claim 1, wherein the first graphics processor core includes first characteristics and the second graphics processor core includes second characteristics, and wherein the first characteristics are different from the second characteristics.

12. The apparatus of claim 1, wherein at least one of the first frame data or the first workload comprises a first set of commands for a first generation of a first frame, wherein at least one of the second frame data or the second workload comprises a second set of commands for a second generation of the second frame, and wherein the first frame is prior to the second frame.

13. The apparatus of claim 1, wherein the first workload and the second workload are associated with a same real-world timestamp, wherein the first workload is associated with a first application timestamp of an application and the second workload is associated with a second application timestamp of the application, and wherein the first application timestamp is different from the second application timestamp.

14. The apparatus of claim 1, wherein the processor is further configured to:

determine that the output of the portion of the second workload is not present in the shared resource, and wherein to alter the first workload, the processor is configured to utilize a default workload based on the determination.

15. The apparatus of claim 1, wherein to output the indication of the altered first workload, the processor is configured to:

store the indication of the altered first workload in at least one of the memory, a buffer, or a cache; or transmit the indication of the altered first workload.

16. The apparatus of claim 1, wherein the apparatus is a wireless communication device comprising at least one of a transceiver or an antenna coupled to the processor.

17. A method of graphics processing, comprising:

obtaining first frame data at a first graphics processor core of a graphics processor and second frame data at a second graphics processor core of the graphics processor, wherein the first frame data is associated with a first time instance and the second frame data is associated with a second time instance, and wherein the first time instance is prior to the second time instance;

altering a first workload associated with the first frame data at the first graphics processor core based on (1) an output of a portion of a second workload for the second frame data and (2) a shared resource between the first graphics processor core and the second graphics processor core; and outputting an indication of the altered first workload.

18. The method of claim 17, further comprising:

executing the portion of the second workload to produce the output of the portion of the second workload; and executing the altered first workload based on the executed portion of the second workload.

19. The method of claim 18, wherein executing the altered first workload comprises executing a portion of the altered first workload in parallel with the execution of the portion of the second workload.

20. A non-transitory computer-readable medium storing computer executable code, the computer executable code, when executed by a processor, causes the processor to:

obtain first frame data at a first graphics processor core of a graphics processor and second frame data at a second graphics processor core of the graphics processor, wherein the first frame data is associated with a first time instance and the second frame data is associated with a second time instance, and wherein the first time instance is prior to the second time instance;

alter a first workload associated with the first frame data at the first graphics processor core based on (1) an output of a portion of a second workload for the second frame data and (2) a shared resource between the first graphics processor core and the second graphics processor core; and output an indication of the altered first workload.

* * * * *